(No Model.)

G. G. KENNEDY, J. A. HOBART & H. A. KIMBALL.
WATER FILTER.

No. 372,025. Patented Oct. 25, 1887.

WITNESSES: INVENTOR

UNITED STATES PATENT OFFICE.

GEORGE G. KENNEDY AND JOHN A. HOBART, OF VINELAND, NEW JERSEY, AND HIRAM A. KIMBALL, OF PHILADELPHIA, PENNSYLVANIA.

WATER-FILTER.

SPECIFICATION forming part of Letters Patent No. 372,025, dated October 25, 1887.

Application filed March 25, 1885. Serial No. 160,086. (No model.)

*To all whom it may concern:*

Be it known that we, GEORGE G. KENNEDY, JOHN A. HOBART, and HIRAM A. KIMBALL, citizens of the United States, the said HIRAM A. KIMBALL residing at Philadelphia, in the county of Philadelphia and State of Pennsylvania, and the said GEORGE G. KENNEDY and JOHN A. HOBART residing in Vineland, in the county of Cumberland and State of New Jersey, have invented certain new and useful Improvements in Water-Filters; and we do hereby declare the following to be a full, clear, and exact description of the invention, such as will enable others skilled in the art to which it appertains to make and use the same.

Our invention relates to water-filters; and the improvement comprises the construction of the filter. We prefer to make the filtering-vessel of clay, mixed with sawdust, bone-dust, or charcoal formed into the desired shape and made porous by burning, and connected with the water-pipes of a dwelling in such a manner that the water from the supply-pipe is forced through said filtering-vessel, as will be hereinafter shown, and more particularly pointed out in the claim.

Figure 1:
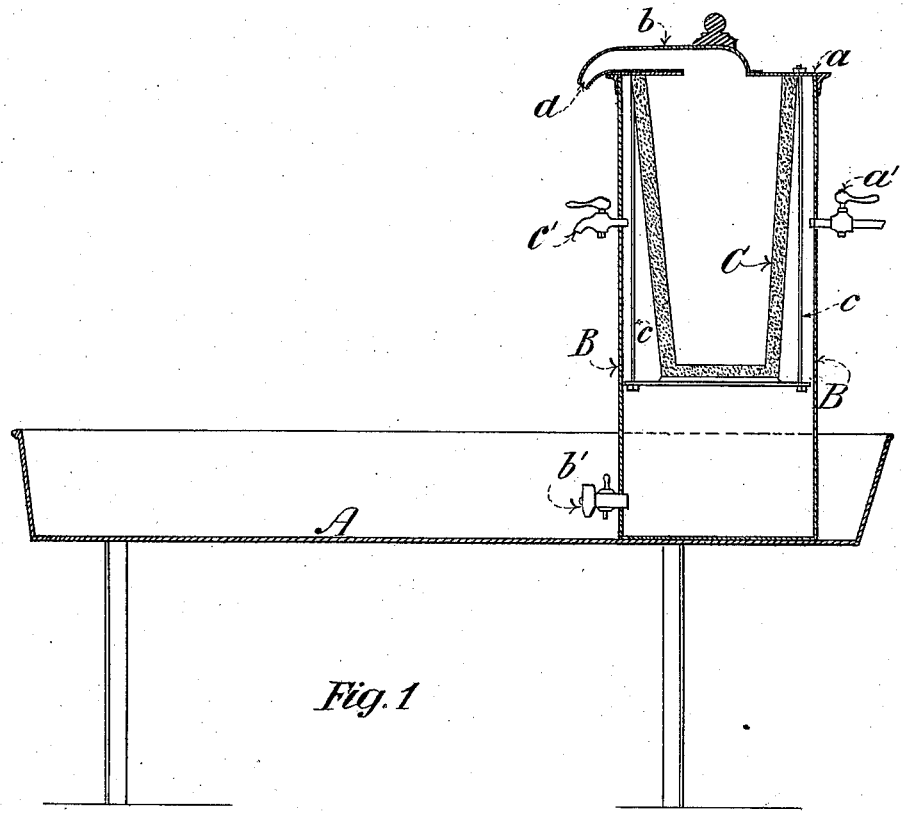
Figure 2:
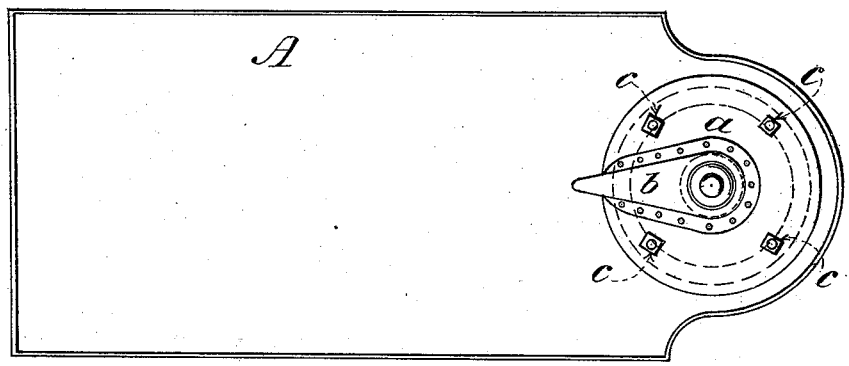

In the accompanying drawings, Figure 1 shows a cross-section of our improved filter attached to the water-pipes of a dwelling and located in an ordinary kitchen-sink. Fig. 2 is a plan of the filter and attachments.

A is an ordinary kitchen-sink; B, the outer reservoir or casing surrounding the filtering-vessel. This outer reservoir may be made of any material that is strong enough to withstand the pressure of the water from the supply-pipe.

C is the porous filtering-vessel.

$c\ c\ c\ c$ are iron rods supporting the filtering-vessel C and securing it to the top $a$ of the outer casing, to which it is cemented, so as to form a water-tight joint between said top $a$ and the filtering-vessel C.

$b$ is a cover for the filter. This may be removable or fastened securely to the top $a$.

$d$ is the spout through which the filtered water is discharged.

$a'$ is a cock on the water-supply pipe.

$b'$ is a cock at the bottom of the reservoir B, for the purpose of drawing off the sediment that may be deposited therein from time to time.

$c'$ is a cock in the reservoir from which unfiltered water may be drawn.

The inlet-cock $a'$ and water-cock $c'$ are located in reservoir B at a height which brings them a considerable distance above the bottom of the filtering-vessel C. By this position the inflowing water through cock $a'$ will create a downward current and clean off the vessel C, and the water-cock $c'$ will give the water for ordinary use at least as clean as when it comes into the reservoir B, and will give off the purest water in said reservoir, owing to its location at a high point therein.

The filter being arranged and connected as shown in Fig. 1, when the supply-cock $a'$ is turned on, the water will flow into the reservoir B, and after filling it the water by the presure is forced through and into the filtering-vessel C, filling this receptacle and flowing out at the spout $d$. When the filter is not in use, the cock $a'$ is turned off.

The filtering-vessel C, applied as described, filters the water as its flows upward and forward, and the dirt and other impurities which may be collected from the water will drop down into vessel B and be carried off through cock $b'$. The form of the vessel C, having sloping sides, gives increased opportunity for this precipitation of the impurities.

To produce the filtering-vessel the different ingredients are mixed together in about the following proportions, viz: three parts, by weight, of sawdust, bone-dust, and charcoal, mixed together and combined in equal proportions of each; fifteen parts, by weight, of ordinary brick-clay, dry. If the clay is pure and free from sand, a small quantity of this material may be added to the clay. After the mass has been thoroughly mixed and a sufficient quantity of water added thereto, it is formed into the required shape and burned in a kiln in the usual way. In this process of burning the fire consumes the combustible portions of the mixture, leaving the clay in a porous condition and very suitable for the purpose named. If the pressure on the water-pipes is more than twenty pounds to the inch, the proportion of clay should be increased. Should the pressure be less than twenty pounds to the inch, the proportion of sawdust, bone-dust, and charcoal is correspondingly increased.

While the above ingredients in about the proportions stated will make the most satisfactory filtering medium, we do not confine ourselves to the exact proportions herein specified, nor to the use of all of the above-named ingredients at one and the same time, as the proportions may be varied; and, instead of the combination of sawdust, bone-dust, and charcoal, either one of these articles may be used separately and the quantity increased correspondingly. The filtering-vessel may be made of any desired shape or size, and the density increased or diminished by using a greater or less proportion of clay, as above stated.

To clean the filtering-vessel C, should it become fouled or clogged up, it is only necessary to close the cocks $a'$ and $c'$ and open the sediment-cock $b'$, when the water and sediment contained in the reservoir B will be discharged therefrom, and the filtered water contained in the filtering-vessel C will be drawn in a reverse way through the sides and bottom of that receptacle, thus forcing off any foreign matter that may have accumulated thereon.

Having thus described our invention, what we claim as new, and desire to secure by Letters Patent of the United States, is—

The combination of the exterior reservoir, B, and the filtering-vessel C, suspended in the upper end thereof and having a discharge through its top, with the supply-cock $a'$ and water-cock $c'$, connected with said reservoir at a point a considerable distance above the bottom of the vessel C, and the discharge-cock $b'$ at the bottom of said reservoir, as set forth.

In testimony whereof we affix our signatures in presence of two witnesses.

GEORGE G. KENNEDY.
JOHN A. HOBART.
HIRAM A. KIMBALL.

Witnesses:
THOS. D. MOWLDS,
OTIS EGAN.